UNITED STATES PATENT OFFICE 1,937,181

WATER-INSOLUBLE AZO-DYESTUFFS AND FIBER DYED THEREWITH

Arthur Zitscher, Offenbach-on-the-Main, Germany, assignor to General Aniline Works, Inc., New York, N. Y., a corporation of Delaware No Drawing. Application January 31, 1933, Serial No. 654,553, and in Germany February 9, 1932

8 Claims. (Cl. 260—76)

The present invention relates to new water-insoluble azo-dyestuffs and to fiber dyed therewith, more particularly it relates to compounds of the following general formula:

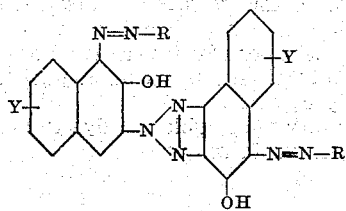

wherein R represents a radical of the benzene, naphthalene, diphenyl or anthraquinone series and Y stands for hydrogen, halogen or an alkoxy group.

I have found that valuable, water-insoluble azo-dyestuffs are obtained by coupling a diazo compound with a 2-(3'-hydroxynaphthyl-2')-4-hydroxy-6.7-benzo-pseudoaziminobenzene of the following formula:

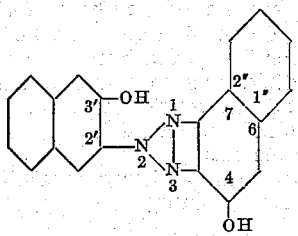

which may also be substituted in the benzene nuclei which do not contain the hydroxy groups, either in substance, on the fiber or on any of the usual substrata adapted for the production of lakes, only such components being used which do not contain any group lending solubility, such as the sulfonic acid or carboxylic acid group.

The new dyestuffs may be used for the preparation of fast dyeings and printings on the fiber or for the preparation of pigments.

The 2-(3'-hydroxynaphthyl-2')-4-hydroxy-6.7-benzo-pseudoaziminobenzenes which may also be substituted in the benzene nuclei which do not contain the hydroxy groups, are obtainable by coupling the diazo-compound of a 2-amino-3-hydroxynaphthalene, the hydroxyl atom of the hydroxy group of which being replaced by a suitable radical as, for instance, by acyl or alkyl radicals, with a 2-amino-3-hydroxynaphthalene, the hydrogen atom of the hydroxy group of which being likewise replaced by a suitable radical, converting the ortho-aminoazo-dyestuff, thus formed, to the pseudoazimine according to known methods and splitting off the radicals linked to the hydroxy groups. They have, in contradistinction to beta-naphthol, a certain affinity for the fiber which allows to produce the dyestuffs on the fiber without an intermediate drying of the grounded goods. The dyeings, thus obtained, possess a better fastness to soaping than those prepared by means of comparable combinations from beta-naphthol.

The following examples serve to illustrate the invention, but they are not intended to limit it thereto, the parts being by weight, unless otherwise stated:

(1) Well boiled and dried cotton yarn is impregnated with a solution which contains per liter 10 grams of 2-(3'-hydroxynaphthyl-2')-4-hydroxy-6.7-benzo-pseudoaziminobenzene, 20 cc. of caustic soda solution of 34° Bé. and 20 cc. of Turkey red oil, thereupon, the yarn is developed in a diazo-solution which contains per liter the diazo-compound from 1.62 grams of 2.5-dichloraniline and has been neutralized by means of sodium acetate; the yarn is then rinsed and soaped.

There is obtained an orange dyeing.

The dyestuff corresponds to the following formula:

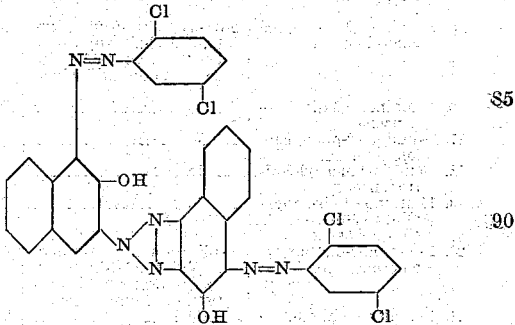

(2) 13.8 parts of 1-amino-2-nitrobenzene are diazotized in known manner. The diazo-solution is combined with a solution prepared from 17 parts of 2-(3'-hydroxynaphthyl-2')-4-hydroxy-6.7-benzo-pseudoaziminobenzene in dilute caustic soda solution to which there has been added the quantity of sodium acetate necessary for binding the excess of mineral acid and 5 parts of Turkey red oil. The dyestuff separated is filtered by suction and washed well; it corresponds to the following formula:

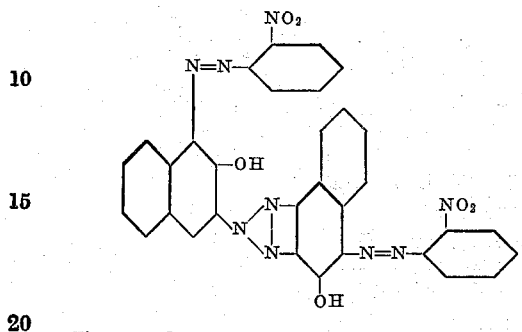

It may be used for the preparation of pigments, advantageously in the form of a paste; mixed with substrata, a yellowish-red lake is obtained.

The following table indicates a number of other combinations obtainable according to the present process but it does not comprise all possibilities for the preparation of dyestuffs by using different components; it, therefore, is not intended to limit the invention to the dyestuffs mentioned therein:

| Diazotizing component | Coupling component | Tint |
|---|---|---|
| 1. 1-amino-2-methyl-5-chlorobenzene | 2-(3'-hydroxynaphthyl-2')-4-hydroxy-6.7-benzo-pseudoaziminobenzene | Reddish-orange |
| 2. 1-amino-4-methyl-2.3-dichlorobenzene | ___do___ | Orange |
| 3. 1-amino-2-phenoxy-5-chlorobenzene | ___do___ | Yellowish-red |
| 4. 1-amino-2-methyl-5-nitrobenzene | ___do___ | Reddish-orange |
| 5. 1-amino-2-methoxy-4-nitrobenzene | ___do___ | Yellowish-red |
| 6. 4-amino-3.2'-dimethyl-azobenzene | ___do___ | Garnet |
| 7. 1-amino-4-benzoylamino-2.5-dimethoxybenzene | ___do___ | Reddish-violet |
| 8. 4-amino-2.5-dimethoxy-4'-nitro-azobenzene | ___do___ | Bluish-black |
| 9. 1-aminoanthraquinone | ___do___ | Brownish-red |
| 10. 1-amino-2-chlorobenzene | 2-(3'-hydroxynaphthyl-2')-4-hydroxy-bz-4''-bromo-6.7-benzo-pseudoaziminobenzene | Reddish-orange |
| 11. 1-amino-2-methyl-3-chlorobenzene | ___do___ | Brownish-red |
| 12. 2-amino-1.6-dibromo-naphthalene | ___do___ | Yellowish-red |
| 13. 4.4'-diamino-3.3'-dimethoxy-diphenyl | ___do___ | Blackish-violet |
| 14. 1-amino-2-nitrobenzene | ___do___ | Yellowish-red |
| 15. 1-amino-2-methyl-4-chlorobenzene | 2-(3'-hydroxy-7'-methoxynaphthyl-2')-4-hydroxy-bz-4''-methoxy-6.7-benzo-pseudoaziminobenzene | Brownish-garnet |
| 16. 1-amino-2.5-dichlorobenzene | ___do___ | Reddish-brown |
| 17. 1-amino-2-phenylsulfonyl-benzene | ___do___ | Do. |
| 18. 1-amino-2-methyl-5-nitrobenzene | ___do___ | Do. |
| 19. 1-amino-4-benzoylamino-5-methoxy-2-chlorobenzene | ___do___ | Currant |
| 20. 1-amino-2-methoxy-5-chlorobenzene | 2-(3'-hydroxy-7'-bromo-naphthyl-2')-4-hydroxy-bz-4''-bromo-6.7-benzo-pseudoaziminobenzene | Bluish-red |
| 21. 1-amino-4-chloro-2-nitrobenzene | ___do___ | Yellowish-red |
| 22. 1-amino-2-phenoxy-5-chlorobenzene | ___do___ | Do. |
| 23. 4-amino-4'-methoxydiphenylamine | ___do___ | Bluish-currant |

The dyestuffs may also be prepared on other fibers, as, for instance, on regenerated cellulose or on animal fibers.

Since an object of the present invention is to provide dyestuffs of good fastness properties, which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble azo-dyestuffs of the following general formula:

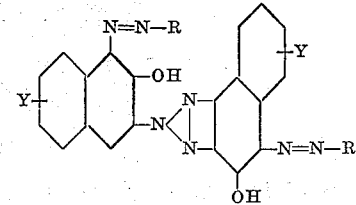

wherein R represents a radical of the benzene, naphthalene, diphenyl or anthraquinone series and Y stands for hydrogen, halogen or an alkoxy group, yielding, when produced on the fiber, dyeings the shades of which vary from orange to red to blue to black and being distinguished by good fastness properties.

2. The water-insoluble azo-dyestuffs of the following general formula:

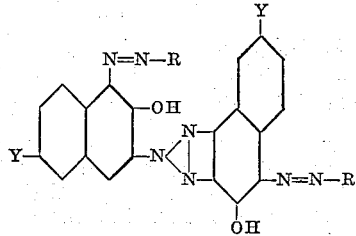

wherein R represents a radical of the benzene, napthalene, diphenyl or anthraquinone series and Y stands for hydrogen, bromine or a methoxy group, yielding, when produced on the fiber, dyeings the shades of which vary from orange to red to blue to black and being distinguished by good fastness properties.

3. The water-insoluble azo-dyestuffs of the following general formula:

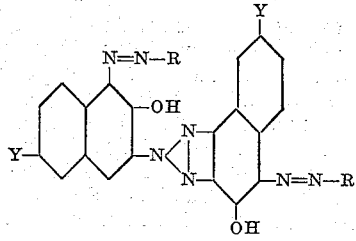

wherein R represents a radical of the benzene series and Y stands for hydrogen, bromine or a methoxy group, yielding, when produced on the fiber, dyeings the shades of which vary from orange to red to blue to black and being distinguished by good fastness properties.

4. Fiber dyed with the azo-dyestuffs as claimed in claim 1.

5. Fiber dyed with the azo-dyestuffs as claimed in claim 2.
6. Fiber dyed with the azo-dyestuffs as claimed in claim 3.
7. The water-insoluble azo-dyestuff of the following formula:
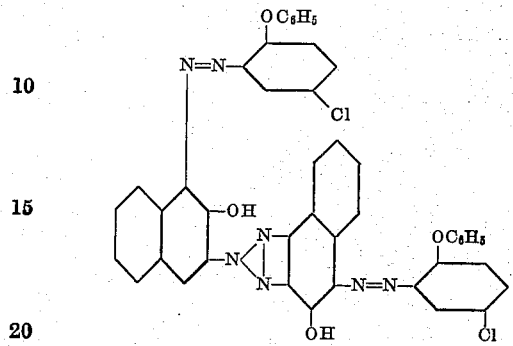
yielding, when produced on the fiber, a yellowish-red dyeing of good fastness properties.
8. Fiber dyed with the azo-dyestuff as claimed in claim 7.
ARTHUR ZITSCHER.